(12) United States Patent
Seiler et al.

(10) Patent No.: US 10,906,702 B2
(45) Date of Patent: Feb. 2, 2021

(54) CARTRIDGE, METHOD OF MANUFACTURING A CARTRIDGE, DISPENSING ASSEMBLY AND METHOD OF ASSEMBLING A DISPENSING ASSEMBLY

(71) Applicant: Sulzer Mixpac AG, Haag (CH)

(72) Inventors: Philipp Seiler, Au (CH); Richard Lavelanet, Balgach (CH); Tobias Bodenmüller, Eriskirch (DE)

(73) Assignee: SULZER MIXPAC AG, Haag (CH)

( * ) Notice: Subject to any disclaimer, the term of this patent is extended or adjusted under 35 U.S.C. 154(b) by 0 days.

(21) Appl. No.: 16/149,754

(22) Filed: Oct. 2, 2018

(65) Prior Publication Data

US 2020/0102122 A1  Apr. 2, 2020

(51) Int. Cl.
| | | |
|---|---|---|
| *B65D 35/10* | (2006.01) |
| *B65D 35/24* | (2006.01) |
| *B65D 47/06* | (2006.01) |
| *B65D 83/00* | (2006.01) |
| *B65D 81/32* | (2006.01) |
| *B29C 45/14* | (2006.01) |
| *B29L 31/00* | (2006.01) |
| *B05C 17/005* | (2006.01) |

(52) U.S. Cl.
CPC ...... *B65D 35/242* (2013.01); *B29C 45/14491* (2013.01); *B65D 35/10* (2013.01); *B65D 47/06* (2013.01); *B65D 81/32* (2013.01); *B65D 83/0055* (2013.01); *B05C 17/00553* (2013.01); *B29L 2031/712* (2013.01)

(58) Field of Classification Search
CPC ...... B65D 35/10; B65D 35/242; B65D 47/06; B65D 81/32; B65D 83/0055; B29L 2031/712; B29C 45/14491; B05C 17/00553

See application file for complete search history.

(56) References Cited

U.S. PATENT DOCUMENTS

| | | |
|---|---|---|
| 3,275,193 A | 9/1966 | Barr |
| 3,467,283 A | 9/1969 | Kinnavy |
| 3,905,517 A | 9/1975 | Friedrich et al. |
| 3,979,025 A | 9/1976 | Friedrich et al. |

(Continued)

FOREIGN PATENT DOCUMENTS

| | | |
|---|---|---|
| EP | 1058657 B1 | 5/2003 |
| EP | 1266844 B1 | 1/2007 |

(Continued)

OTHER PUBLICATIONS

Extended European Search Report dated May 14, 2019 in corresponding European Patent Application No. 18198353.7.

*Primary Examiner* — Frederick C Nicolas

(74) *Attorney, Agent, or Firm* — Global IP Counselors, LLP

(57) ABSTRACT

A cartridge for a material to be dispensed includes a rigid head part having a dispensing outlet and a flexible film forming a cartridge wall, with the film bounding a cartridge chamber for the material to be dispensed, extending at least partially in a longitudinal direction of the cartridge and having a front end that is connected to the head part, wherein the head part has an outer circumferential surface. An inner surface of the front end of the film is sealingly and non-releasably connected to the outer circumferential surface of the head part.

17 Claims, 6 Drawing Sheets

(56) References Cited

U.S. PATENT DOCUMENTS

| | | |
|---|---|---|
| 4,233,725 A | 11/1980 | Burger |
| 4,687,663 A | 8/1987 | Schaeffer |
| 5,002,623 A | 3/1991 | Steer et al. |
| 5,184,757 A | 2/1993 | Giannuzzi |
| 5,305,920 A | 4/1994 | Reiboldt et al. |
| 5,360,146 A | 11/1994 | Ikushima |
| 5,409,143 A * | 4/1995 | Sigel ................ B05C 17/00583 |
| | | 222/183 |
| 5,593,066 A | 1/1997 | Konuma et al. |
| 5,647,510 A | 7/1997 | Keller |
| 5,993,720 A | 11/1999 | Konuma et al. |
| 6,129,244 A | 10/2000 | Horth |
| 6,273,307 B1 * | 8/2001 | Gross ................ B65D 75/5883 |
| | | 220/613 |
| 6,334,548 B1 | 1/2002 | Ichikawa et al. |
| 6,860,406 B2 * | 3/2005 | Kobetsky ................ B29C 65/18 |
| | | 222/92 |
| 6,971,787 B2 | 12/2005 | Botrie et al. |
| 7,137,531 B2 | 11/2006 | Arghyris et al. |
| 7,144,170 B2 | 12/2006 | Parks et al. |
| 7,445,135 B2 | 11/2008 | Miyata et al. |
| 7,815,384 B2 | 10/2010 | Parks et al. |
| 8,276,755 B2 | 10/2012 | Matsumura et al. |
| 8,690,012 B2 | 4/2014 | Stoeckli et al. |
| 9,132,944 B2 * | 9/2015 | Schick ................ B65D 75/5883 |
| 9,238,544 B2 | 1/2016 | Schulz et al. |
| 9,517,488 B2 * | 12/2016 | Frey ................ B05C 17/00559 |
| 9,968,959 B2 | 5/2018 | Frey |
| 10,071,837 B2 * | 9/2018 | Franca ................ B65D 47/2031 |
| 10,124,521 B2 * | 11/2018 | Geiger ................ B65D 35/10 |
| 10,442,582 B1 * | 10/2019 | Ekkert ................ B29C 66/53263 |
| 10,486,880 B2 * | 11/2019 | Franca ................ B29C 66/53263 |
| 2004/0000562 A1 | 1/2004 | Gantner |
| 2005/0109796 A1 | 5/2005 | Bourque et al. |
| 2005/0138792 A1 | 6/2005 | Black et al. |
| 2006/0006194 A1 * | 1/2006 | Niggemyer ................ B65D 1/0246 |
| | | 222/107 |
| 2006/0021996 A1 | 2/2006 | Scott et al. |
| 2006/0144854 A1 | 7/2006 | Clemens et al. |
| 2006/0188314 A1 | 8/2006 | Hunter et al. |
| 2010/0108709 A1 | 5/2010 | Frey |
| 2014/0174037 A1 | 6/2014 | Frey |
| 2015/0147430 A1 * | 5/2015 | Dzikowicz ................ A23L 2/00 |
| | | 426/2 |
| 2016/0045928 A1 | 2/2016 | Frey |
| 2017/0072426 A1 | 3/2017 | Frey |
| 2018/0169693 A1 | 6/2018 | Frey |
| 2018/0280235 A1 * | 10/2018 | Franca ................ A61J 1/10 |

FOREIGN PATENT DOCUMENTS

| | | |
|---|---|---|
| EP | 1284163 B1 | 3/2008 |
| EP | 2322449 B1 | 6/2012 |
| EP | 3195941 A1 | 7/2017 |
| EP | 3263483 A1 | 1/2018 |
| FR | 2820127 A1 | 8/2002 |
| JP | H03133748 A | 6/1991 |
| JP | 6-53469 A | 2/1994 |
| JP | 6-336254 A | 12/1994 |
| JP | 2001225853 A | 8/2001 |
| JP | 3624132 B2 | 3/2005 |
| JP | 4248694 B2 | 4/2009 |
| WO | 2009113502 A1 | 9/2009 |

* cited by examiner

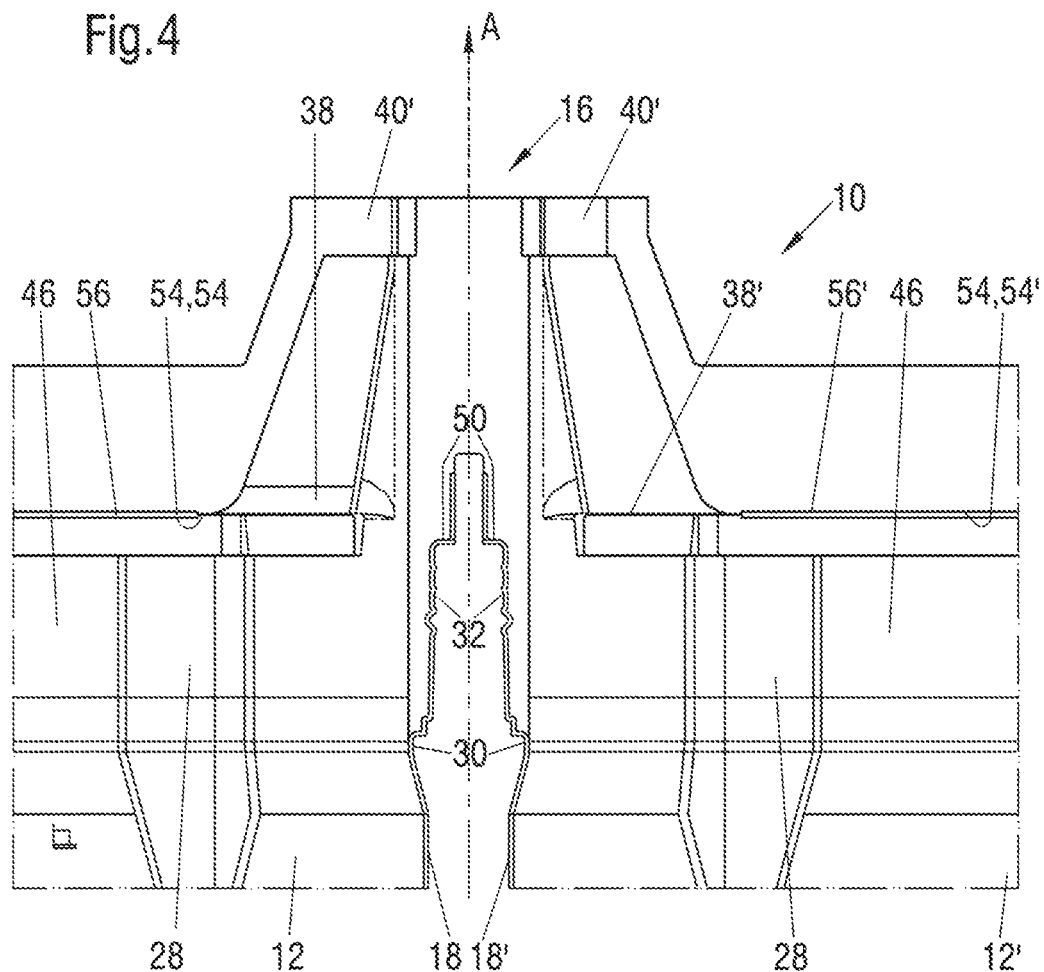
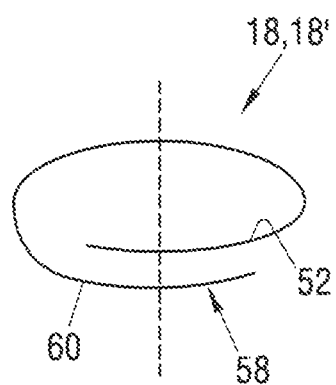
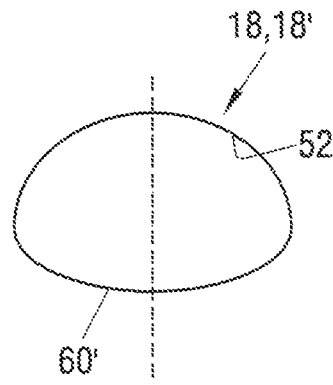
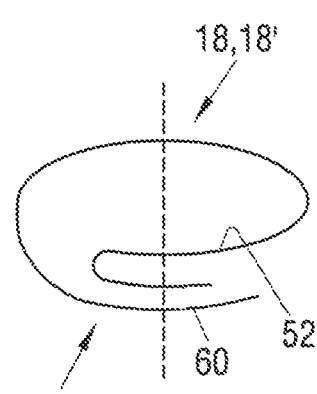

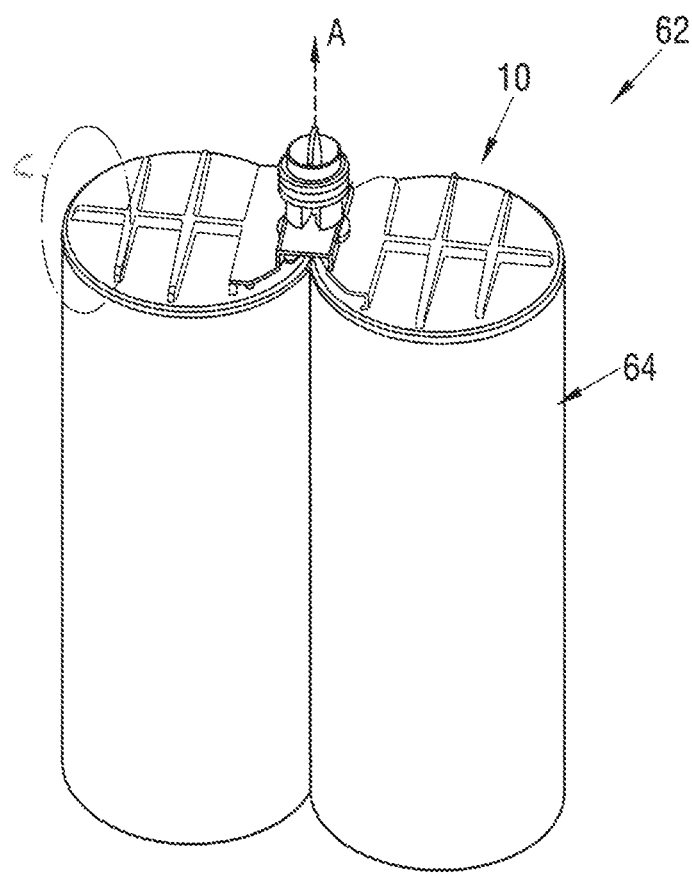
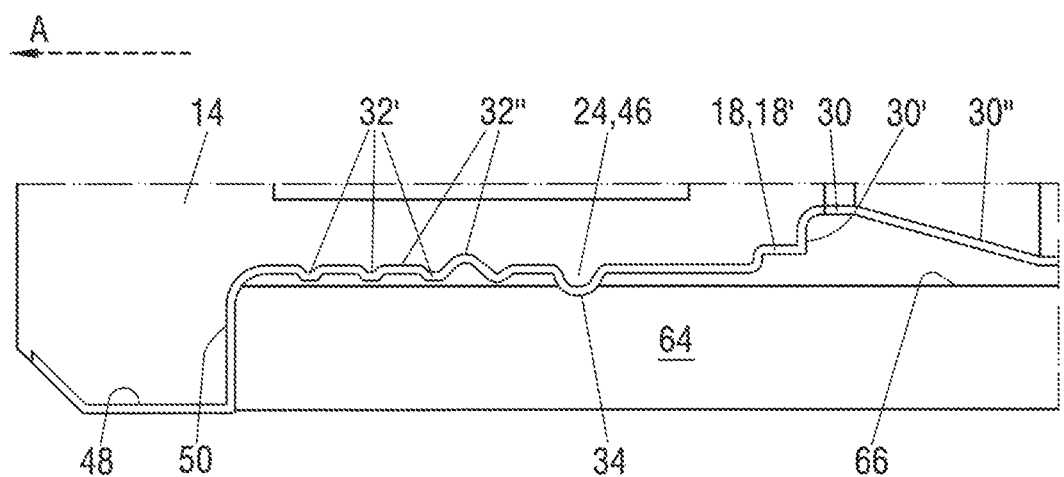

CARTRIDGE, METHOD OF MANUFACTURING A CARTRIDGE, DISPENSING ASSEMBLY AND METHOD OF ASSEMBLING A DISPENSING ASSEMBLY

BACKGROUND

Field of the Invention

The present invention relates to a cartridge for a material to be dispensed comprising a rigid head part having a dispensing outlet and a flexible film forming a cartridge wall, with the film bounding a cartridge chamber for the material to be dispensed, extending at least partially in a longitudinal direction of the cartridge and having a front end that is connected to the head part, the head part having an outer circumferential surface, and an inner surface of the front end of the film sealingly and non-releasably connected to the outer circumferential surface of the head part. The invention further relates to a method of manufacturing a cartridge, to a dispensing assembly, and to a method of assembling a dispensing assembly comprising such a cartridge.

BACKGROUND OF THE INVENTION

In the industrial sector, in the construction industry, for example of buildings, and also in the dental sector, cartridges are frequently used to store liquid flowable, frequently pasty or viscous to highly viscous substances and to dispense them for the respective application as required. Examples for such substances are joint sealing compounds, compounds for chemical dowels or chemical anchors, adhesives, pastes or impression materials in the dental sector. These cartridges are usually produced from plastic and are manufactured in an injection molding process.

A distinction is made between single-component systems in which the material to be dispensed is only made of one component and two-component or multicomponent systems in which at least two different components are stored in separate chambers of the same cartridge or in separate cartridges, wherein the components are intimately mixed on dispensing by a dynamic or static mixing apparatus. Examples for this are two-component adhesives or chemical dowels which only harden after the mixing of the two components. Two-component systems are in particular also used in the industrial sector for paints which are often used to generate functional protective layers such as for corrosion protection.

SUMMARY

For reasons of environmental protection, film cartridges are increasingly being used. In contrast to regular cartridges which are completely produced from plastic in an injection molding process, at least parts of film cartridges are designed as a film. Usually the cartridge wall(s) bounding the cartridge chamber(s) is/are made of a film which is connected to a head part made of rigid material, e.g. plastic, comprising the dispensing outlet. This has several advantages. On the one hand, the unfilled film cartridges can be stored and transported in a collapsed state from the cartridge manufacturers to the manufacturers of the filling materials (media) who then take care of the filling of the empty cartridges. Only after being filled the film cartridge is in its expanded state which is comparable in size to a regular non-collapsible cartridge. This means that the necessary space for storage and for transportation can be reduced, since the collapsed cartridges have a reduced size in comparison to regular non-collapsible cartridges.

On the other hand, once the cartridges have been used, i.e. reduced to the collapsed state by dispensing the filling material, the cartridges are significantly reduced in size and weight in comparison to regular cartridges so that the cost of disposal is also reduced. In any case the carbon footprint associated with the film cartridges is reduced in comparison to plastic cartridges that are completely formed in an injection molding process.

U.S. Pat. No. 5,593,066 discloses film cartridges in which the film is attached to the head part of the cartridges. During the manufacture of such a film cartridge with an injection molded head, one has to place a cylindrical film over a core that is part of a mold. The attachment of the film at the head part can be problematic and if not carried out correctly leads to a detachment of the film from the head part.

During the manufacture of a film cartridge with an injection molded head, one has to sealingly attach a film to the rigid head part. For this, a required length or size of the film has to be cut from a larger film piece or film roll. If this cut or trimmed film is attached to the head part, a cutting area of the film where the film was cut could pose a problem: as a result of the cut, individual fiber-like or hair-like film parts of the film could become loose or detached from the main surface of the film in the cutting area of the film. The connection of the head part with a section of the film which includes such a cutting area could thus lead to a leak or faulty attachment in the region of the parts of the film comprising such a cutting area.

For this reason it is an object of the invention to enhance the connection between the film and the cartridge so that a cartridge can be produced in a more reliable manner. It is a further object of the invention to reduce the number of rejected cartridges due to detached injection molded heads. It is yet a further object of the present invention to propose a cartridge of the initially named kind and a method of manufacturing such a cartridge by which the total manufacturing costs can be reduced.

This object is satisfied by a cartridge having the features described herein.

Such a cartridge for a material to be dispensed comprises a rigid head part having a dispensing outlet and a flexible film forming a cartridge wall, with the film bounding a cartridge chamber for the material to be dispensed, extending at least partially in a longitudinal direction of the cartridge and having a front end connected to the head part, the head part having an outer circumferential surface, the outer circumferential surface comprising formations, wherein an inner surface the front end of the film sealingly and non-releasably connected to the outer circumferential surface of the head part and to the formations present at the outer circumferential surface of the head part.

Sealingly and non-releasably connected in the present invention means that there will be no leakage of the cartridge contents during storage or use and that the cartridge will not detach from the head piece during normal storage and use conditions.

The present inventors have found that better sealing and non-releasable connections may generally be obtained between materials having similar or compatible compositional properties, such as polyolefins with polyolefins, particularly PE with PE or PP with PP, or polyamides with polyamides, such as Nylon 6 or Nylon 66 with themselves or with each other, and/or through the use of surface roughening, surface modification treatments such as corona discharge to increase the surface energy and/or to introduce polar groups, primers and/or adhesives into the respective composition.

In addition to application testing, other test methods include measurements of sealing via qualitative means such as pressing air-filled cartridges under water and inspecting for bubbles or more quantitative methods such as leak gas detectors, vacuum burst or creep tests and seal strength measurements, and measurements of bond strength include measurements of tensile, peel or stripping strength.

Furthermore, it is desirable that the connection does not release during storage and especially use and, for example, is capable of withstanding pressures of at least 5 Bar and preferably of up to 55 bar, i.e. the pressures that may arise on dispensing material from the cartridge chamber.

In this connection it should be noted that the application filed by the present applicant at the European Patent Office with the application number EP18198347.9 and the application DE202018105661.1 filed at the German Patent and Trademark Office are respectively hereby incorporated by reference.

By injection molding the head part to an inner surface of the film, the mechanical properties of the bond can be improved. It has, for example, been found that on use with a multi-layer film, the innermost layer of the film should be the thickest layer of the film for reasons of stability and hence in the region where the bond is formed between the innermost surface and the head part, the most material is present leading to an improved bond in comparison to films that attach to an inner surface of a head part.

Such formations typically form additional fixation means or elements and, in particular comprise protrusions, ribs, pins, hooks, webs, notches, recesses and/or grooves, and are disposed at the outer circumferential surface of the head part in order to enhance the bond between the film and the head part.

The provision of such formations also enables the film forming the cartridge wall to be actively deformed at the respective formation to collect any slack present in the film to ensure that those parts of the inner surface of the film that should be attached to the outer circumferential surface of the head part are attached to the head part. By attaching the inner surface in this way no air pockets arise between the film and the head part. Such air pockets lead to faulty connections and hence to the rejected cartridges.

Moreover, through the use of such formations variances in a diameter of the film can be compensated by the film's property to elongate to a certain degree under strain.

The dimensions of the formations should namely be chosen such that all the slack can be collected even at the largest possible film diameter and such that the strain on films having the smallest possible diameter does not lead to a damage of the film.

It should be noted that the above cartridge can be filled both using front filling and back filling techniques.

It should further be noted that due to the injection molding of the head part such that the film is connected at the outer circumferential surface in contrast to the inner circumferential surface also avoids problems of connecting a film which arise as a result of cutting the film, such as individual fiber-like or hair-like film parts of the film, as these are no longer present in the direct vicinity of a material stored within the cartridge, but at an outer surface of the head part and so do not come into direct contact with the material.

It should be noted in this connection that U.S. Pat. No. 5,593,066 does not disclose the use of such formations nor the problems leading to the requirement of use of such formations.

In this connection it should further be noted that a flexible film bag is a film bag that can be folded together in the empty state, e.g. in the manner of a concertina, and that after filling and a possible dispensing of the components present therein can be unfolded and refolded without the film bag being damaged or becoming limited in its function.

Further benefits and advantageous embodiments of the invention will become apparent from the dependent claims, from the description and from the accompanying drawings.

The formations may comprise grooves formed in the outer circumferential surface of the head part. Grooves can be formed in a comparatively simple manner through the use of inserts and enable the film forming the cartridge wall to be stretched during the manufacturing process so that as little as possible slack is present in the film in order to attach the film to the head part.

The grooves may extend in parallel to the longitudinal direction of the cartridge. Such grooves have found to be beneficial for the attachment of the film to the head part.

The grooves may have a triangular-like shape in a cross-section thereof, i.e. in a side view of the cartridge, in particular with a base of the triangle forming the groove being spaced apart furthest from the dispensing outlet and optionally forming a bottom end of the head part. By forming the grooves in a triangular manner both stresses and strains can be introduced into the film ensuring an improved attachment of the film at the head part. Film bags attached at these grooves appear to have diamond shaped grooves in the outer surface of the film due to the possible interaction between the mold in which the head part is formed and the materials used.

The formations may comprise a ring recess that is formed in the outer circumferential surface and that circumferentially extends around the outer circumferential surface perpendicular to the longitudinal direction of the cartridge. Like the grooves the recess can ensure that stresses and strains are introduced into the film to ensure an improved attachment of the film at the head part. By arranging the recess perpendicular to the grooves the stresses and strains introduced into the film act in a direction perpendicular to the grooves, so that the film is stressed and strained in two dimensions further enhancing the connection between the film and the head part.

The ring recess may extend through the grooves, especially wherein the ring recess extends through the base of the grooves, with the recess respectively the base forming the bottom end of the head part and a middle part of the grooves present in the film forming the cartridge wall. By arranging the recess about a geometric center of the grooves the film can be stressed and strained in an ideal manner in two dimensions. It should be noted in this connection that the middle part of the grooves comprises the geometric center and at most 40% of a length of the diamond-shaped groove in a direction in parallel to the longitudinal direction centered about the geometric center.

The ring recess may have an L-shaped cross-section in the longitudinal direction, with a short limb of the L in particular being arranged perpendicular to the longitudinal direction of the cartridge and/or the long limb of the L being arranged inclined to the longitudinal direction of the cartridge and optionally also to the short limb of the L. Such a ring recess is found to be beneficial for a correct attachment and alignment of the film at the head part. In this connection it should be noted that the short limb of the L may coincide with the base respectively the bottom end of the head part.

The formations may comprise one or more wave-like structures formed in the outer circumferential surface, optionally wherein the wave-like structures may extend perpendicular to the longitudinal direction of the cartridge. Such wave like structures can be used to introduce stresses and strains into the film in two-dimensions which is found to be beneficial for a correct attachment and alignment of the film at the head part.

The wave-like structures may comprise between 2 and 5 valleys and/or between 2 and 5 peaks. This number of peaks and valleys is found to be beneficial for the attachment of the film to the head part. Including fewer or more peaks and valleys can hinder the process of attaching the film to the head part.

Some of the valleys may have a greater depth than other ones of the valleys of the wave-like structure. Additionally or alternatively, some of the peaks may have a greater height than other ones of the peaks of the wave-like structure. In this way variations in the stresses and strains introduced into the film can be varied to ensure that as little as possible slack remains in the film while not stressing film bags of smaller diameter.

One wave-like structure may be formed between directly adjacent grooves. This arrangement has been found to be beneficial during the attachment of the film to the head part.

The formations may comprise one or more ribs projecting from the outer circumferential surface, with each rib, preferably extending perpendicular to the longitudinal direction of the cartridge and in particular being arranged between directly adjacent grooves. The ribs can introduce point like stresses and strains into the film as desired.

The cartridge wall may be received in a support sleeve, with the outer circumferential surface having the formations being arranged within the sleeve and the one or more ribs forming a press-fit and/or interference fit type of connection with an inner surface of the sleeve. Thus, the ribs can fulfill two functions, namely the correct attachment of the film at the head part and also the correct attachment of the cartridge in a sleeve which is required for a correct placement of the cartridge in a dispenser.

The head part may comprise a collar, with the collar surrounding the dispensing outlet in a radially outer region of the head part, extending in the longitudinal direction and defining at least regionally the outer circumferential surface of the head part to which the film is connected, optionally wherein the collar is received in the sleeve. Such a collar improves the amount of surface area available at the head part for connecting the film to the head part.

The collar may be formed radially inwardly of an outermost part of the head part, with a ledge being formed between the outermost part of the head part and the outer circumferential surface of the head part present at the collar. This design has found to be practical in use of the cartridge with a sleeve.

The inner surface of the film may be attached to the outer circumferential surface of the head part, wherein a front end of the film may extend beyond the outer circumferential surface of the head part, optionally such that it is connected to the ledge and possibly also to the outermost part of the head part. In this way the attachment of the film at the head part can be further improved.

The cartridge chamber may be filled with a material, for example, with a material selected from the group of members consisting of topical medications, medical fluids, wound care fluids, cosmetic and/or skin care preparations, dental fluids, veterinary fluids, adhesive fluids, disinfectant fluids, protective fluids, paints and combinations of the foregoing.

Such fluids and hence the cartridge can therefore be expediently used in the treatment of target areas such as the nose (e.g. anti-histaminic creams etc.), ears, teeth (e.g. molds for implants or buccal applications (e.g. aphtas, gum treatment, mouth sores etc.), eyes (e.g. the precise deposition of drugs on eyelids (e.g. chalazion, infection, anti-inflammatory, antibiotics etc.), lips (e.g. herpes), mouth, skin (e.g. anti-fungal, dark spot, acne, warts, psoriasis, skin cancer treatment, tattoo removal drugs, wound healing, scar treatment, stain removal, anti-itch applications etc.), other dermatological applications (e.g. skin nails (for example anti-fungal applications, or strengthening formulas etc.) or cytological applications.

Alternatively the fluids and hence the cartridge can also be used in an industrial sector both for the production of products as well as for the repair and maintenance of existing products, e.g. in the building industry, the automotive industry, the aerospace industry, in the energy sector, e.g. for windturbines, etc. The dispensing assembly can, for example, be used for the dispensing of construction material, sealants, bonding material, adhesives, paints, coatings and/or protective coatings.

In this connection it should be noted that the cartridge may be a one-component cartridge comprising one cartridge chamber. Alternatively the cartridge may be a two-component cartridge comprising two cartridge chambers, with a respective chamber being provided e.g. for a hardener and the other one for a corresponding binder material. In this way the design presented herein can be used for a plethora of types of cartridges and applications.

Optionally each cartridge chamber of a two-component cartridge may be bounded by an own head part comprising a chamber outlet for the respective cartridge chamber, in particular with the head parts either being integrally formed or separately formed, with the separately formed head parts preferably being connectable to one another and/or connected to one another, e.g. via the chamber outlets; and/or with the chamber outlets together forming the dispensing outlet. This further illustrates the applicability of the current design for use with film cartridges.

The dispensing outlet may project from the rigid head part in a direction opposed to the direction of extent of the flexible film forming the at least one cartridge wall. In this way e.g. a mixing tip can be attached to the dispensing outlet in a facile manner.

The film may be a multi-layer film comprising at least two, three, four, five or more layers. Such films enable a longer storage life of the components stored in the cartridge in comparison to films made of only one material.

In this connection it should be noted that if the film bag comprises a fin seal rather than an overlap seal, the number of components of a multi-component film can be reduced, since the outer layer does not have to have a material common to the inner layer. The same is true for an extruded film bag.

Bulges may be present in an internal end face of the head part comprising the dispensing outlet. These bulges form channels through which a material of the head part may flow during the injection molding process and aid in the attachment of the film forming the cartridge wall.

In this connection the head part may have a Shore D hardness selected in the range of 40 to 99. Preferably the Shore D hardness of the head part lies in the range of 40 to 60.

The head part may comprise polyethylene, polypropylene, polyamide, polyethylenter-ephthalate or polybutylenterephthalate. The head part may for example comprise polyamide in the form of PA-6 (perlon) or PA-66 (nylon). Polyamide has the advantage that it has a good mechanical stability and is thus suitable for the head part.

Polyethylenterephthalats (PET) may also be used for the head part. PET can namely be processed in a facile manner and has a good chemical resistance.

In accordance with an embodiment the head part is made of a high density PE (HDPE). High density polyethylene (HDPE) has a density in the range of 930 kg/m$^3$ to 970 kg/m$^3$ auf.

The film forming the film bag may be a multilayer film having at least two layers formed from different materials. In the preferred choice the film is a five-layer film comprising a sandwich structure in which the outer layer is formed of PE (20 to 40 µm thickness) which is connected to a layer of PA (10 to 20 µm) via a tie layer (1.5 to 2.5 µm). The PA layer in turn is connected via a further tie layer (1.5 to 2.5 µm) to an aluminum or aluminum alloy layer (5 to 10 µm). The aluminum or aluminum alloy layer is in turn connected to a further PA layer (10 to 20 µm) via a further tie layer (1.5 to 2.5 µm) which is then connected to an inner layer corresponding to the inner surface 42, via a via a further tie layer (1.5 to 2.5 µm) with the inner layer having a thickness selected in the range of 45 to 100 µm.

It should be noted that the respective tie layers are not considered to be individual layers of a multi-layered film, they are merely present to ensure a bond is formed between the individual layers.

The materials of the film can differ from the above mentioned materials as can their respective thicknesses. It should be noted in this connection that the films typically have a thickness selected in the range of 70 to 200 µm, in particular of 120 to 170 µm.

According to a further aspect the present invention relates to a cartridge for a material to be dispensed comprising a rigid head part having a dispensing outlet and a flexible film forming a cartridge wall, with the film bounding a cartridge chamber for the material to be dispensed, extending at least partially in a longitudinal direction of the cartridge and having a front end that is connected to the head part, wherein the head part has an outer circumferential surface, wherein an inner surface of the front end of the film is sealingly and non-releasably connected to the outer circumferential surface of the head part, wherein bulges are present in an internal end face of the head part comprising the dispensing outlet.

According to a further aspect the present invention relates to a dispensing assembly having a cartridge comprising one or more cartridge chambers, the one or more cartridge chambers being filled with a respective material and having the sleeve into which the respective cartridge chamber is inserted, the dispensing assembly optionally further comprising a dispenser and/or a mixing tip. Using such a dispensing assembly one can dispense the desired materials in a facile manner.

According to a further aspect the present invention relates to a method of assembling a dispensing assembly having a cartridge comprising one or more cartridge chambers, a sleeve and optionally a dispenser, the method comprising:

inserting said one or more cartridge chambers into a respective sleeve;

fixing the one or more cartridge chambers in the respective sleeve by at least one of a press fit and an interference fit between some of the formations present at the respective cartridge chamber and an inner surface of the respective sleeve; and optionally inserted the cartridge and the sleeve into the dispenser.

The advantages associated with the cartridge can beneficially be exploited in such a method.

According to a further aspect the present invention relates to a method of manufacturing a cartridge according to any of the preceding claims, the method comprising:

placing the film on a core of a mold;

introducing inserts into the mold which represent a shape of the formations directly adjacent to the film; and injection molding the head part in a head space of the mold to form the head part with its outer circumferential surface having the formations and to sealingly and non-releasably bond the front end of the film to the outer circumferential surface of the head part.

In this way a cartridge having the advantages discussed in the foregoing can be produced in a facile, cost-effective and reproducible manner.

Further embodiments of the invention are described in the following description of the Figures. The invention will be explained in the following in detail by embodiments and with reference to the drawing in which is shown:

BRIEF DESCRIPTION OF THE DRAWINGS

FIG. 4 is an enlarged sectional view of section B of FIG. 2;

FIG. 5 is a schematic sectional view showing a first type of seam;

FIG. 6 is a schematic sectional view showing a second type of seam;

FIG. 7 is a perspective view of a dispensing assembly;

FIG. 8 is an enlarged sectional view of section C of FIG. 7;

FIG. 13 is a schematic sectional view through a further type of cartridge.

DETAILED DESCRIPTION OF THE EMBODIMENTS

Figure 1:
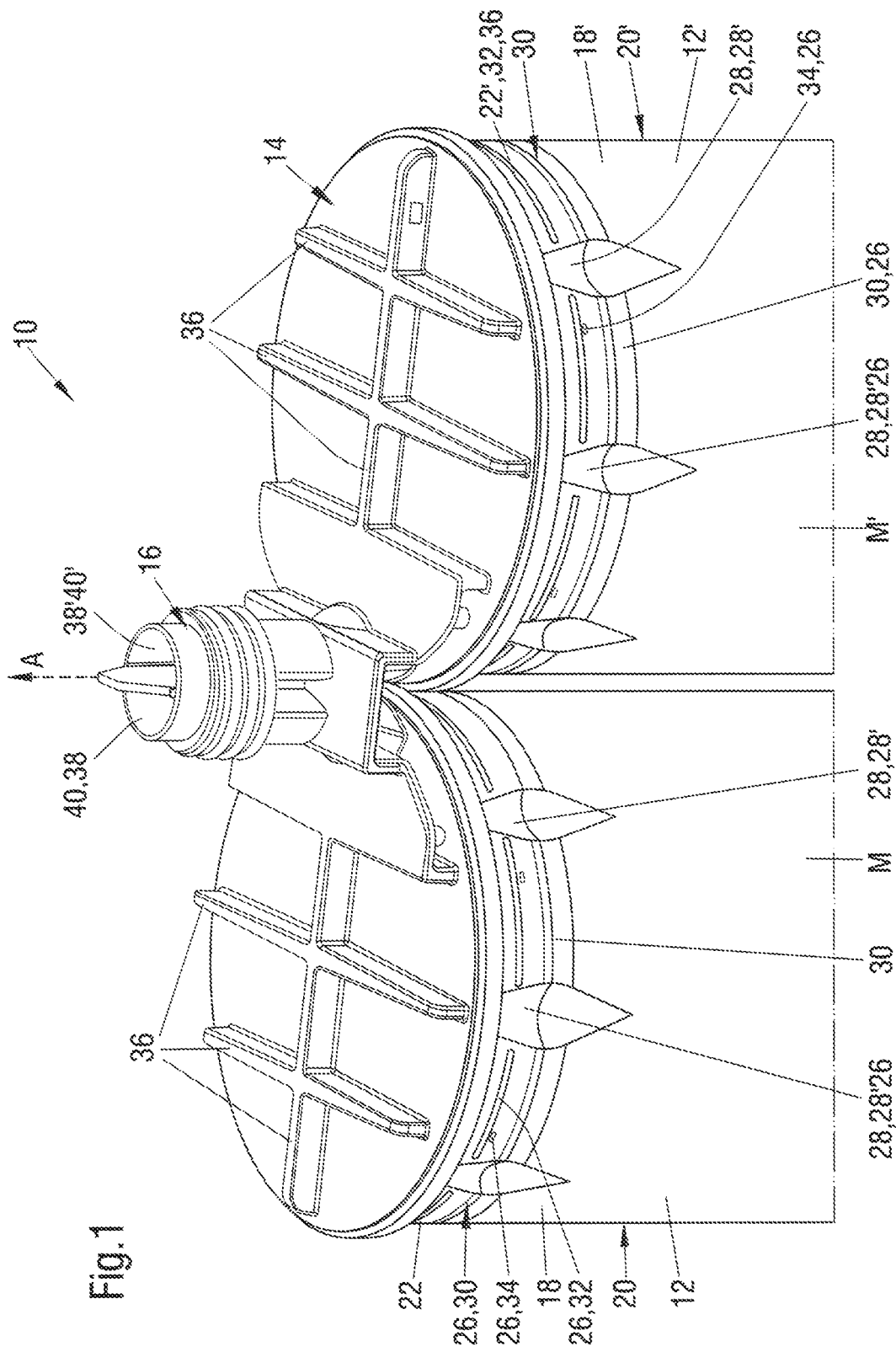
FIG. 1 is a perspective view of a first type of cartridge.

In the following, the same reference numerals will be used for parts having the same or equivalent function. Any statements made having regard to the direction of a component are made relative to the position shown in the drawing and can naturally vary in the actual position of application.

FIG. 1 shows a two-component cartridge 10 configured to store and dispense two materials M, M' from respective cartridge chambers 12, 12'. The two-component cartridge 10 comprises a rigid head part 14 having a dispensing outlet 16 and a flexible film 18, 18' forming a respective cartridge wall 20, 20' for each cartridge chamber 12, 12'. The film 18, 18' bounds the cartridge chamber 12, 12' and extends at least partially in a longitudinal direction A of the cartridge 10. The film 18, 18' having a front end 22, 22' that is connected to the head part 14.

Figure 3:
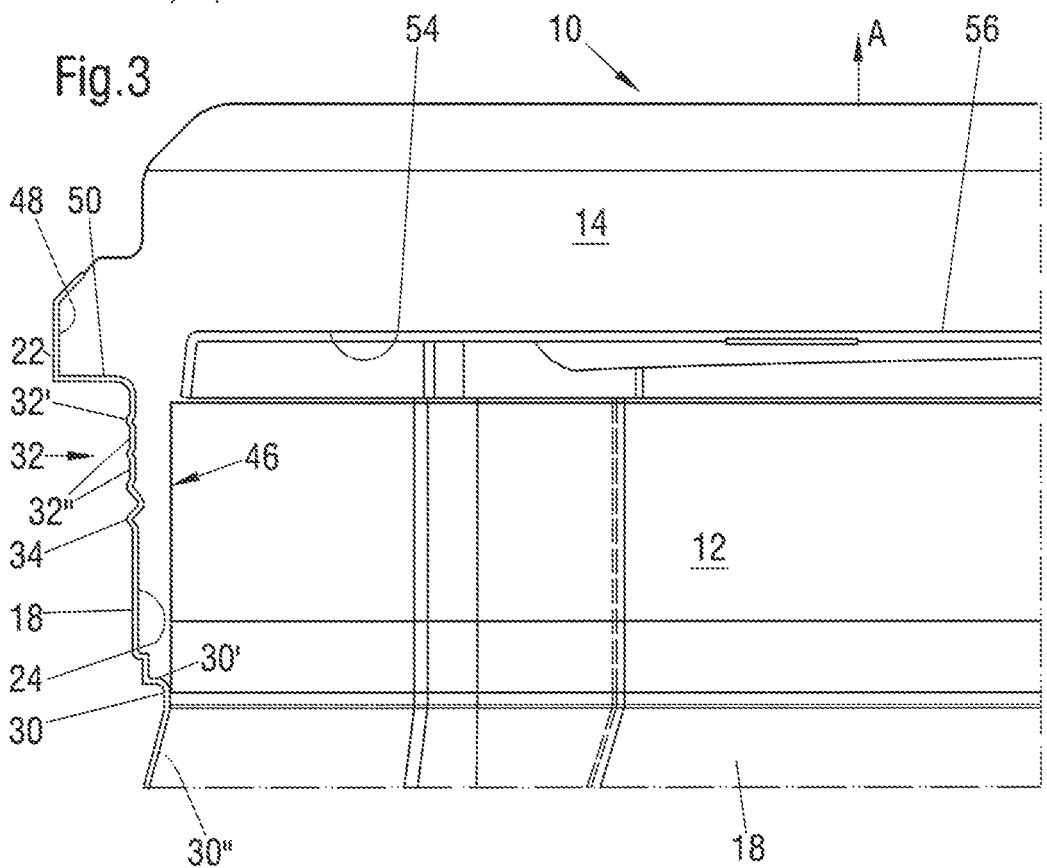
FIG. 3 is an enlarged sectional view of section A of FIG. 2.

The head part 14 has an outer circumferential surface 24 (see e.g. FIG. 3). The outer circumferential surface comprises formations 26. The front end 22, 22' of the film 18, 18' is sealingly and non-releasably connected to the outer circumferential surface 24 of the head part and to the formations 26 present at the outer circumferential surface 24 of the head part 14.

The formations 26 comprise grooves 28 formed in the outer circumferential surface 24 of the head part 14. The grooves 28 extend in parallel to the longitudinal direction A of the cartridge 10. In a side view of the cartridge 10, see e.g. FIG. 2, or in the perspective view of FIG. 1, the grooves 28 have a triangular-like shape (see FIG. 12) in a cross-section thereof. During the process of attaching the film 18, 18' to the grooves 28 this results in diamond-shaped grooves 28' being visible in an outer surface 60 of the film 18, 18'. Depending on the shape of the grooves 28' also other shapes can be visible in the outer surface 60 of the film18, 18'.

Figure 12:
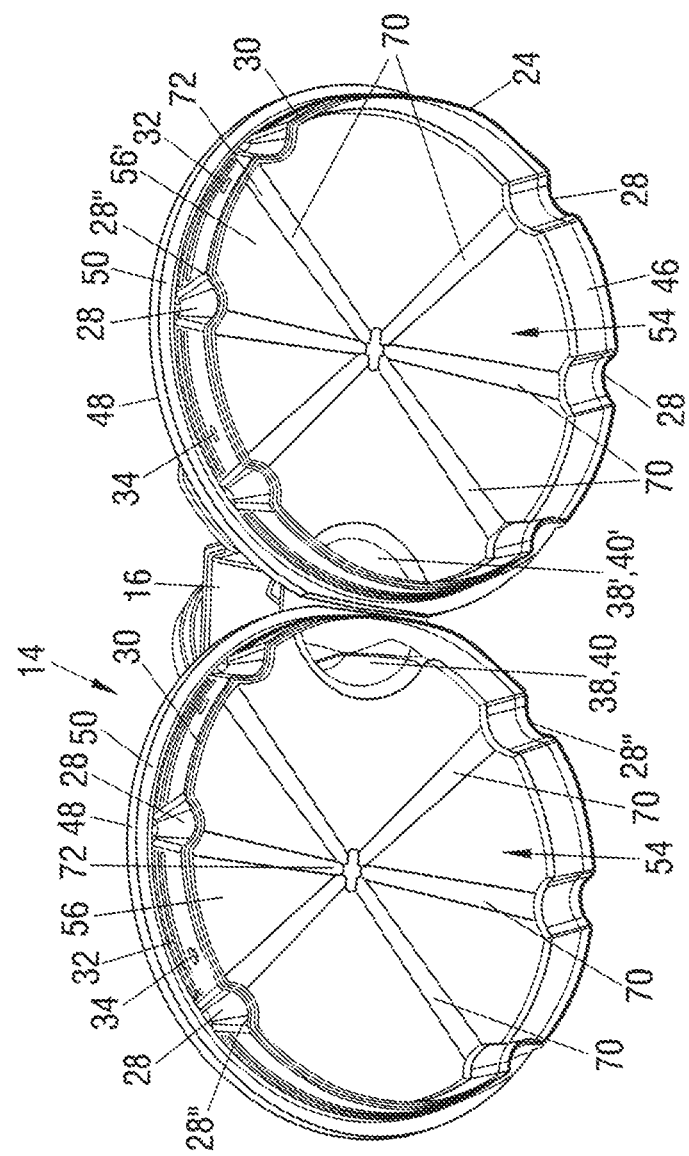
FIG. 12 is a perspective view from below of a head part.

A base 28" of a triangle forming the groove 28 forms a bottom end 68 of the head part 14 (see FIG. 12).

A further type of formation 26 formed at the cartridge 10 is a ring recess 30 that is formed in the outer circumferential surface 24 and that circumferentially extends around the outer circumferential surface 24 perpendicular to the longitudinal direction A of the cartridge 10.

A further type of formation 26 formed at the cartridge 10 is a wave-like structure 32 formed in the outer circumferential surface 24. The respective wave-like structure 32 extends perpendicular to the longitudinal direction A of the cartridge 10.

A further type of formation 26 formed at the cartridge 10 is a rib 34 projecting from the outer circumferential surface 24. In the examples shown the ribs 34, each extend perpendicular to the longitudinal direction A of the cartridge 10 and are arranged between directly adjacent grooves 28. Other arrangements of the ribs 34, for example grooves 28 arranged in parallel to the longitudinal direction A or more than one per pair of ribs 34 arranged between adjacent grooves 28 are possible.

It should be noted that the ribs 34 project further from the outer circumferential surface 24 than the respective wave-like structure 32.

It should further be noted that the respective groove 28 projects further into the outer circumferential surface 24 than most of the recess 30, and that the grooves 28 and the recess 30 optionally project further into the outer circumferential surface 24 than the ribs 34 or wave-like structures 32 project from the outer circumferential surface 24.

Reinforcement ribs 36 are disposed at the side of the head part 14 remote from the cartridge wall 20, 20'. The reinforcement ribs 36 serve the purpose of reinforcing the head part 14 so that this can easily withstand the pressures applied thereon during a dispensing process.

The dispensing outlet 16 is a common outlet which combines a respective chamber outlet 38. Two outlet passages 40, 40' lead from the respective cartridge chamber 12, 12' to an end 42 of the dispensing outlet 16.

The dispensing outlet 16 is, on the one hand, configured to be sealed off by a cap co-operating with a plunger (not shown) in a storage state of the cartridge 10. The dispensing outlet 16 is further configured to cooperate with a mixing tip (not shown) that is typically used to dispense the materials M, M' stored in the cartridge 10 in a dispensing state of the cartridge 10.

Figure 2:
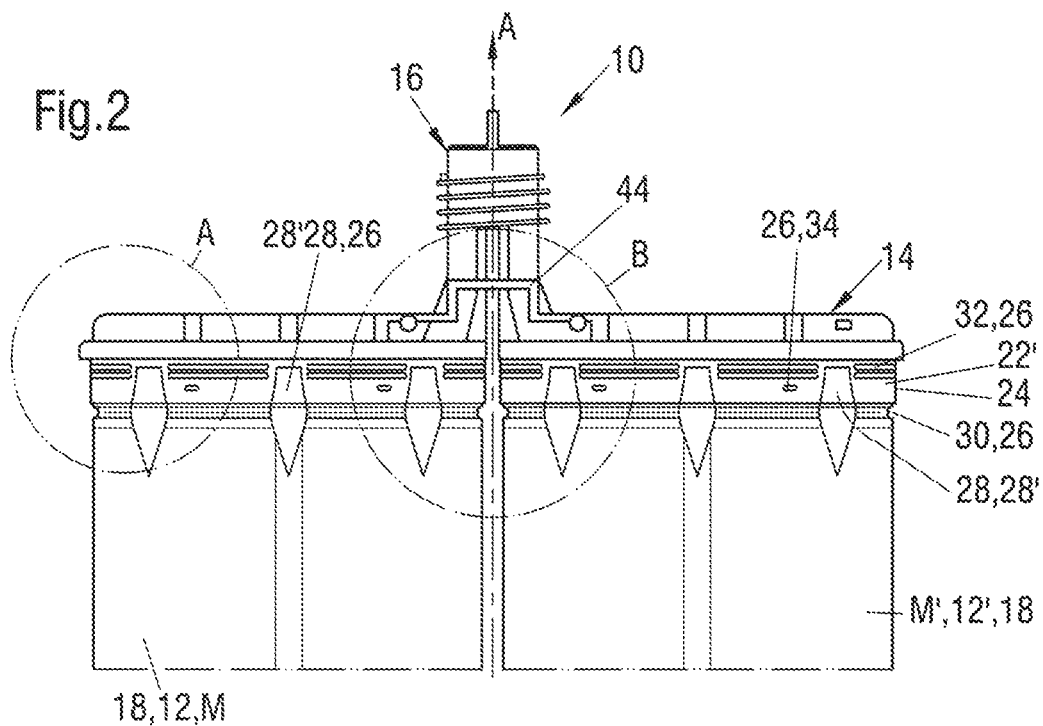
FIG. 2 is a side view of the cartridge of FIG. 1.

FIG. 2 shows a side view of the cartridge of FIG. 1. The dispensing outlet 16 projects from a pedestal 44 that is arranged on the head part 14 and which forms a connection between the two cartridge chambers 12, 12' of the cartridge 10 of FIG. 1. The pedestal 44 serves the purpose of reinforcing the head part 14 in the region of the dispensing outlet 16 so that the dispensing outlet 16 and the head part 14 can easily withstand the pressures applied thereon during a dispensing process.

The FIGS. shown herein respectively show a two-component side by side cartridge 10. It should be noted that the head part 14 and the features and methods of attachment of the head part 14 to the respective film 18, 18' can naturally be employed at a one-component cartridge (not shown) comprising only one cartridge chamber 12, or at a coaxial cartridge comprising two cartridge chambers 12, 12' that are coaxially arranged with respect to one another about the longitudinal direction A.

The cartridge 10 shown in the foregoing has a common head part 14 for both chambers 12, 12'. However, it is naturally also possible to form each cartridge chamber 12, 12' of a two-component cartridge 10 with separate head parts that are then connected to another e.g. in a permanent or releasable manner (both not shown), for example in the region of the outlet chambers 38, 38', with the combined chamber outlets 38, 38' then forming the dispensing outlet 16.

FIG. 3 shows an enlarged sectional view of section A of the cartridge 10 of FIG. 2. The head part 14 comprises a collar 46. The collar 46 surrounds the dispensing outlet 16 in a radially outer region of the head part 14 and extends in the longitudinal direction A and defines the outer circumferential surface 24 of the head part 14 to which the film 18, 18' is connected.

The collar 46 is formed radially inwardly of an outermost part 48 of the head part 14. A ledge 50 is formed between the outermost part 48 of the head part 14 and the outer circumferential surface 24 of the head part 14 present at the collar 46.

It should be noted in this connection that a length of the collar 46 in the longitudinal direction A is typically selected in the range of 2 mm to 20 mm, preferably 5 mm to 7 mm.

It should further be noted that a length of the ledge 50 in a direction perpendicular to the longitudinal direction A is typically selected in the range of 0.5 mm to 8 mm, preferably 1 mm to 4 mm.

An inner surface 52 of the film 18 is attached to the outer circumferential surface 24 of the head part 14, to the ledge 50 and also to the outermost part 48 of the head part 14.

In this connection it should be noted that the film 18, 18' may be connected to the outer circumferential surface 24 of the head part 14 by one of injection molding, by glueing, by welding, in particular ultrasonic welding, by shrinking, by clamping and by mounting.

FIG. 3 further shows that the ring recess 30 has an L-shaped cross-section in the longitudinal direction A. A short limb 30' of the L is arranged perpendicular to the longitudinal direction A of the cartridge 10 and the long limb 30" of the L is arranged inclined to the longitudinal direction A of the cartridge 10 and also to the short limb 30' of the L.

It should be noted in this connection that a length of the short limb 30' perpendicular to the longitudinal direction A is typically selected in the range of 0.3 mm to 7 mm, preferably 0.8 mm to 4 mm. It should further be noted that the short limb 30' may form the bottom end 54 (see FIG. 12)

It should further be noted that a length of the long limb 30" is typically selected in the range of 1 mm to 12 mm, preferably 2 mm to 8 mm.

It should further be noted that a height of the rib 34 projecting from the outermost surface 24 is typically selected in the range of 0.05 to 3 mm, preferably in the range of 0.15 to 1.5 mm. A length of the rib 34 perpendicular to the longitudinal direction A is typically selected in the range 0.1 to 4 mm, in particular 0.2 to 2 mm.

The respective wave-like structure 32 may comprise between 2 and 5 valleys 32" and between 2 and 5 peaks 32', with a respective peak having a height typically selected in the range of 0.05 to 2 mm, preferably in the range of 0.1 to 1 mm. The respective valley 32" is either formed in a plane coinciding with the outer circumferential surface 24 or has a depth of up to 3 mm, preferably of up to 0.5 mm.

It should be noted in this connection that some of the valleys 32' may have a greater depth than other ones of the valleys 32" of the wave-like structure 32. It should further be noted that some of the peaks 32' may have a greater height than other ones of the peaks 32' of the wave-like structure 32. The wave-like structure 32 is generally formed between directly adjacent grooves 28.

The ring recess 30 intersects the grooves 28' present in the film 18, 18', but has a lesser depth than that of the grooves 28.' In this connection it should be noted that the grooves 28 may extend over a height of the collar 46, with the diamond-like grooves 28' extending further beyond the bottom end 68. The ring recess 30 is arranged to extend through a middle part of the grooves 28.

The grooves 28 typically have a length selected in the range of 2 mm to 20 mm, preferably 5 mm to 7 mm; and/or has a depth a depth from the outer circumferential surface 24 typically selected in the range of 0.4 mm to 5 mm, preferably 0.5 mm to 2 mm.

The diamond-like grooves 28' typically have a length selected in the range of 2 mm to 30 mm, preferably 10 mm to 14 mm;

FIG. 4 shows an enlarged sectional view of section B of the cartridge 10 of FIG. 2. The film 18, 18' also at this side of the cartridge chamber 12, 12' extends beyond an internal end face 54 of the head part 14 comprising the respective chamber outlet 38, 38'. It should be noted in this connection that a respective second film 56, 56' is attached to the head part 16 to cover the end face 54. The second film 56, 56' is arranged to at least partially, in particular almost completely or completely cover the end face 54.

The second film 56, 56' is arranged to prevent a diffusion of the material M, M' stored in the cartridge chamber 12, 12' through the end face 54 of the head part 14.

The properties of the second film 56, 56' can be selected identical to the properties of the film 18, 18' forming the cartridge wall 20, 20', the film 56, 56' may be selected from a material which bonds to the material of a rear surface 54' forming the end face 54 of the head 14 part, preferably the material of the second film 56, 56' and the material of the rear surface 54' of the head part 14 are identical.

FIG. 5 shows a schematic sectional view of the film 18, 18' taken perpendicular to the longitudinal direction A. The cartridge wall 20, 20' comprises a connection seam 58 extending in the longitudinal direction A over a length of the cartridge wall 20, 20'. The connection seam 58 comprising overlapping regions of the film. FIG. 5 shows a first type of seam 58. The connection seam 58 comprises a part of the inner surface 52 of the film 18, 18' adjacent to a first longitudinal edge of the film 18, 18' which is connected, in particular bonded, to a part of the outer surface 60 of the film 18, 18' adjacent to an opposite second longitudinal edge of the film 18, 18'. Such a seam 58 is commonly known as an overlap seam 58.

FIG. 6 shows a schematic sectional view of a further type of film 18, 18' taken perpendicular to the longitudinal direction A similar to the drawing shown in FIG. 5. FIG. 6 shows a second type of seam 58'. The connection seam 58' comprises a part of the inner surface 52 of the film 18, 18' adjacent to a first longitudinal edge of the film 18, 18' which is connected, in particular bonded, to a part of the inner surface 52 of the film 18, 18' adjacent to an opposite second longitudinal edge of the film 18, 18'. Such a seam 58' is commonly known as a fin seal 58'.

In this connection it should be noted that a closure seam (not shown) may be disposed at a rear end of the film 18, 18'. The closure seam then runs traverse to the longitudinal direction A and connects two regions of the inner surface 42 of the film 18, 18' to close the rear end of the cartridge chamber 12, 12' in a seal tight manner.

FIG. 7 shows a perspective view of a dispensing assembly 62. The dispensing assembly 62 comprising the two-component cartridge 10, with the one or more cartridges 10 being filled with a respective material M, M' and a respective 64 sleeve into which the respective cartridge chamber 12, 12' is inserted. The cartridge walls 20, 20' are received in the support sleeves 64.

FIG. 8 shows an enlarged sectional view of section C of the dispensing assembly 62. The collar 46 is received in the sleeve 64 as is the outer circumferential surface 24 having the formations 26 arranged within the sleeve 64 and the one or more ribs 34 forming a press-fit and/or interference fit type of connection with an inner surface 66 (see FIG. 8) of the sleeve 64.

On assembling the dispensing assembly 62, the cartridge 10, respectively the cartridge chambers 12, 12' are inserted into the respective sleeve 64. The cartridge 10 is fixed to the respective sleeve 64 by at least one of a press fit and an interference fit between some of the formations 26 present at the respective cartridge 10 and the inner surface 66 of the respective sleeve 64.

In this connection it should be noted that the sleeve may be made from plastic, e.g. PE or PA or from a metal, e.g. aluminum or an aluminum alloy, for example in an extrusion process or an injection molding process.

Figure 9:
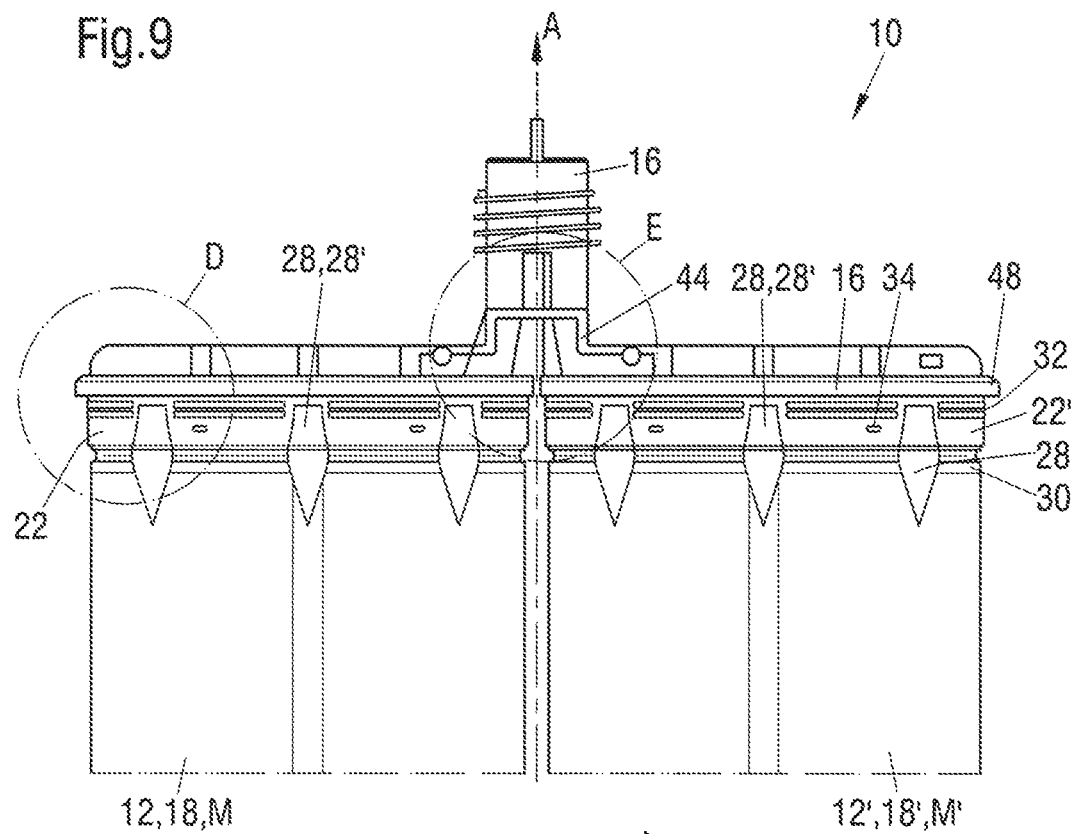
FIG. 9 is a side view of a further cartridge.

FIG. 9 shows a side view of a further cartridge 10. The cartridge 10 of FIG. 9 is also a two-component cartridge 10. The difference between the cartridge 10 of FIG. 9 and the one shown e.g. in FIG. 1 lies in the attachment of the film 18, 18' to the head part 14.

Figure 10:
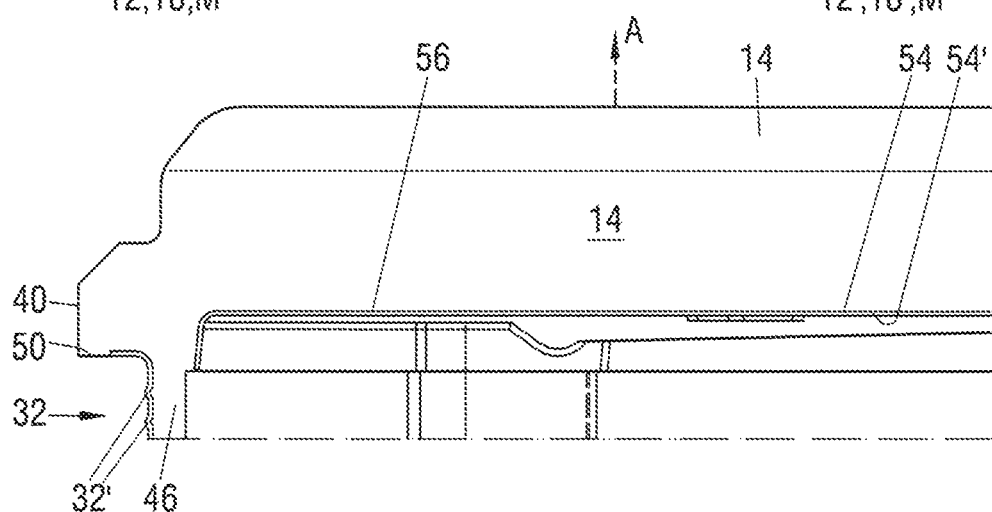
FIG. 10 is an enlarged sectional view of section D of FIG. 9.

FIG. 10 shows an enlarged sectional view of section D of the cartridge 10 of FIG. 9. The inner surface of the film 18 is attached to the outer circumferential surface 24 of the head part 14. The front end 22 of the film 18 extends beyond the outer circumferential surface 24 of the head part 14 and such that it projects partly along the ledge 50. The front end 22 of the film 18 does not project over the complete length of the ledge 50 or over the outermost part 48 of the head part 14 as is the case for the cartridge 10 of FIGS. 1 to 4.

Figure 11:
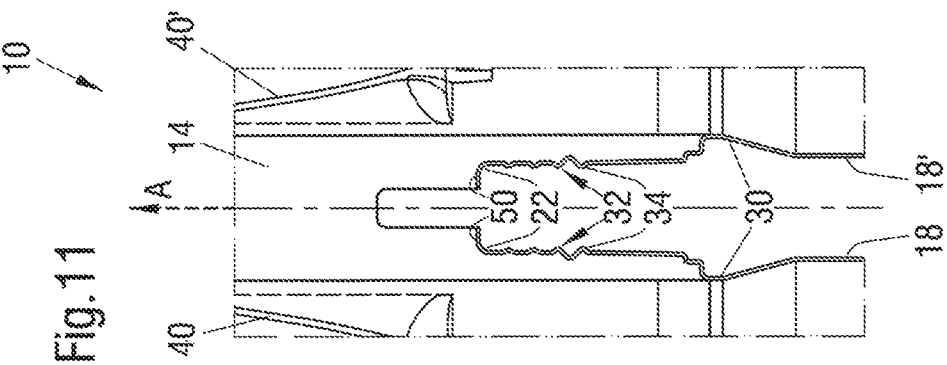
FIG. 11 is an enlarged sectional view of section E of FIG. 9.

FIG. 11 shows an enlarged sectional view of section E of FIG. 9 which is similar to the drawing shown in FIG. 4. Like in FIG. 10 the front end 22, 22' of the film 18, 18' does not project over the complete length of the ledge 50 or over the outermost part 48 of the head part 14 as is the case for the cartridge 10 of FIGS. 1 to 4.

FIG. 12 shows a perspective view from below of the head part 14. The grooves 28 are seen which taper from a bottom end 68 of the head part towards the ledge 50 in the manner of a triangle. On injection molding the head part 14 to the film 18, 18' this structure aids in the formation of the diamond shaped grooves 28' that are visible e.g. in FIG. 1 in the outer surface 60 of the film 18, 18'.

FIG. 12 further shows the presence of a plurality of bulges 70 that are present in the internal end face 54 of the head part 14 comprising the chamber outlets 38, 38'. The respective bulges 70 connect with two of the grooves 28. The bulges 70 are formed by passages present in the core (not shown) of the injection mold and are the passages via which the material of the head part 14 is injected into the injection mold. Through the provision of such passages and the presence of the bulges 70, the attachment of the film 18, 18' to the head part can be improved as the flow of material in the mold can be positively influenced thereby.

In this connection it should be noted that it is preferred if there is one bulge 70 per pair of grooves 28. It is further preferred if the plurality of grooves intersect at one point of intersection 72, with the point of intersection 72 forming the inlet position of the flow of material into the injection mold.

FIG. 13 shows a schematic sectional view through the film 18, 18' of a further type of cartridge 10. The film 18, 18' is a blown extruded film 18, 18' that does not comprise a longitudinal seam in contrast to the examples shown in FIGS. 5 and 6.

On forming the cartridges 10 discussed in the foregoing a film 18, 18' is placed on a core of a mold (not shown). Not shown inserts are then introduced into the mold. The inserts comprises structures which correspond to a shape of the formations 26 directly adjacent to the film 18, 18'. Once the mold is closed the head part 14 is injection molding in a head space of the mold to form the head part 14 with its outer circumferential surface 24 having the formations 26 to sealingly and non-releasably bond the front end 22, 22' of the film 18, 18' to at least the outer circumferential surface 24 of the head part 14.

In this connection it should be noted that the films 18, 18' discussed in the foregoing may comprise the inner surface 52 and the outer surface 60. It is the inner surface 52 that is connected to the outer circumferential surface 24 of the head part 14. The connection preferably being formed by a bond produced in an injection molding process to form an integral connection structure.

The film 18, 18' is preferably a multilayer film having at least two layers formed from different materials. In the preferred choice the film is a five layer film comprising a sandwich structure in which the outer layer is formed of PE (20 to 40 μm thickness) which is connected to a layer of PA (10 to 20 μm) via a tie layer (1.5 to 2.5 μm). The PA layer in turn is connected via a further tie layer (1.5 to 2.5 μm) to an aluminum or aluminum alloy layer (5 to 10 μm). The aluminum or aluminum alloy layer is in turn connected to a further PA layer (10 to 20 μm) via a further tie layer (1.5 to 2.5 μm) which is then connected to an inner layer corresponding to the inner surface 42, via a via a further tie layer (1.5 to 2.5 μm) with the inner layer having a thickness selected in the range of 45 to 100 μm.

It should be noted that the respective tie layers are not considered to be individual layers of a multi-layered film, they are merely present to ensure a bond is formed between the individual layers.

The materials of the film 18, 18' can differ and from the above mentioned materials as can their respective thicknesses. It should be noted in this connection that the films 18, 18' typically have a thickness selected in the range of 70 to 200 μm, in particular of 120 to 170 μm.

The head part 14 typically comprises plastic and in particular consists of plastic. with at least the part of the film 18, 18' that is connected to the head part 14 also comprising plastic and in particular consisting of plastic.

Generally speaking the plastic of the head part 14 and the plastic of the part of the film 18, 18' being connected to the head part 14 are selected from plastics which bond and are preferably the same so that the strongest possible bond is formed there between. The head part 14 is beneficially produced by injection molding as this permits a facile, reproducible, fast and cost-effective manufacture of the cartridges.

It should further be noted that the cartridge wall 20, 20' may be formed from a blown extruded film sleeve.

It should also be noted that the material of the inner layer 52 and the material of the outer layer 60 may be identical or that the material of the inner layer 52 and the material of the outer layer 60 may be different from one another.

It should also be noted that the thickness of the inner layer 52 and the thickness of the outer layer 60 may be identical or that the thickness of the inner layer 52 is greater than the thickness of the outer layer 60.

It should be noted in this connection that the front end 22, 22' of the film 18, 18' may be clamped between the outer circumferential surface 24 of the head part 14 and an inner surface of a clamping member (not shown), in particular a clamping ring, surrounding the outer circumferential surface 24 of the head part 16. Such a clamping ring is used to support the attachment of the film 18, 18' at the head part 14.

The invention claimed is:

1. A cartridge for a material to be dispensed, the cartridge comprising:
    a rigid head part having a dispensing outlet; and
    a flexible film forming a cartridge wall, with the film bounding a cartridge chamber for the material to be dispensed, the film extending at least partially in a longitudinal direction of the cartridge and having a front end that is connected to the head part, the head part having an outer circumferential surface, the outer circumferential surface comprising formations, an inner surface of the front end of the film sealingly and non-releasably connected to the outer circumferential surface of the head part and to the formations present at the outer circumferential surface of the head part, the formations comprising a ring recess formed in the outer circumferential surface that circumferentially extends around the outer circumferential surface perpendicular to the longitudinal direction of the cartridge.

2. The cartridge of claim 1,
    wherein the formations comprise grooves formed in the outer circumferential surface of the head part.

3. The cartridge of claim 2, wherein the grooves extend in parallel to the longitudinal direction of the cartridge.

4. The cartridge of claim 2,
    wherein the grooves have a triangular-like shape in a cross-section thereof.

5. The cartridge in accordance with claim 1,
    wherein the formations further comprise grooves formed in the outer circumferential surface of the head part and wherein the ring recess extends through the base of the grooves.

6. The cartridge in accordance with claim 1,
    wherein the ring recess has an L-shaped cross-section in the longitudinal direction.

7. The cartridge of claim 1, wherein the inner surface of the film is attached to the outer circumferential surface of the head part, wherein a front end of the film extends beyond the outer circumferential surface of the head part.

8. The cartridge of claim 1,
wherein the cartridge chamber is filled with the material, or
the cartridge is a one-component cartridge comprising one cartridge chamber, or
the cartridge is a two-component cartridge comprising two cartridge chambers; or
the dispensing outlet projects from the rigid head part in a direction opposed to the direction of extent of the flexible film forming the at least one cartridge wall, or
the film is a multi-layer film comprising at least two, three four, five or more layers.

9. The cartridge for a material in accordance with claim 1, wherein bulges are present in an internal end face of the head part comprising the dispensing outlet.

10. The cartridge in accordance with claim 1,
wherein the ring recess forms a bottom end of the head part.

11. The cartridge of claim 1, wherein the formations comprise one or more wave-like structures formed in the outer circumferential surface and the wave-like structures extend perpendicular to the longitudinal direction of the cartridge.

12. A cartridge for a material to be dispensed, the cartridge comprising:
a rigid head part having a dispensing outlet; and
a flexible film forming a cartridge wall, with the film bounding a cartridge chamber for the material to be dispensed, the film extending at least partially in a longitudinal direction of the cartridge and having a front end that is connected to the head part, the head part having an outer circumferential surface, the outer circumferential surface comprising formations, an inner surface of the front end of the film sealingly and non-releasably connected to the outer circumferential surface of the head part and to the formations present at the outer circumferential surface of the head part, the formations comprising one or more ribs projecting from the outer circumferential surface.

13. The cartridge in accordance with claim 12,
wherein the cartridge wall is received in a support sleeve, with the outer circumferential surface having the formations arranged within the sleeve and the one or more ribs forming a press-fit or interference fit type of connection with an inner surface of the sleeve.

14. A cartridge for a material to be dispensed, the cartridge comprising:
a rigid head part having a dispensing outlet; and
a flexible film forming a cartridge wall, with the film bounding a cartridge chamber for the material to be dispensed, the film extending at least partially in a longitudinal direction of the cartridge and having a front end that is connected to the head part, the head part having an outer circumferential surface and a collar, the outer circumferential surface comprising formations, an inner surface of the front end of the film sealingly and non-releasably connected to the outer circumferential surface of the head part and to the formations present at the outer circumferential surface of the head part, and the collar surrounding the dispensing outlet in a radially outer region of the head part, extending in the longitudinal direction and defining at least regionally the outer circumferential surface of the head part to which the film is connected.

15. The cartridge of claim 14,
wherein the collar is formed radially inwardly of an outermost part of the head part, with a ledge being formed between the outermost part of the head part and the outer circumferential surface of the head part present at the collar.

16. A dispensing assembly, comprising:
a cartridge, the cartridge comprising a rigid head part having a dispensing outlet and a flexible film forming a cartridge wall, with the film bounding a cartridge chamber for a material to be dispensed, the film extending at least partially in a longitudinal direction of the cartridge and the film having a front end connected to the head part, the head part having an outer circumferential surface, the outer circumferential surface comprising formations, an inner surface of the front end of the film sealingly and non-releasably connected to the outer circumferential surface of the head part and to the formations present at the outer circumferential surface of the head part, the cartridge comprising one or more cartridge chambers each being filled with a respective material and the dispensing assembly further having a sleeve into which the cartridge is inserted.

17. A method of assembling a dispensing assembly comprising a cartridge, the cartridge having a rigid head part having a dispensing outlet and a flexible film forming a cartridge wall, with the film bounding a cartridge chamber for a material to be dispensed, the film extending at least partially in a longitudinal direction of the cartridge and the film having a front end connected to the head part, the head part having an outer circumferential surface, the outer circumferential surface comprising formations, an inner surface of the front end of the film sealingly and non-releasably connected to the outer circumferential surface of the head part and to the formations present at the outer circumferential surface of the head part, the cartridge further having one or more cartridge chambers, the dispensing assembly further comprising a sleeve, the method comprising:
inserting the one or more cartridge chambers into a respective sleeve;
fixing the one or more cartridge chambers in the respective sleeve by at least one of a press fit and an interference fit between some of the formations present at the respective cartridge chamber and an inner surface of the respective sleeve; and
inserting the cartridge and the sleeve into the dispenser.

* * * * *